(12) United States Patent
S et al.

(10) Patent No.: US 12,072,788 B2
(45) Date of Patent: Aug. 27, 2024

(54) INTELLIGENT ACCESSIBILITY TESTING

(71) Applicant: SAP SE, Walldorf (DE)

(72) Inventors: Shanavas Madeen S, Krishnagir (IN); Win Acharya, Bangalore (IN); Rakhi Mishra, Bangalore (IN); Havva Mehfooz, Bangalore (IN)

(73) Assignee: SAP SE, Walldorf (DE)

( * ) Notice: Subject to any disclaimer, the term of this patent is extended or adjusted under 35 U.S.C. 154(b) by 106 days.

(21) Appl. No.: 17/953,021

(22) Filed: Sep. 26, 2022

(65) Prior Publication Data

US 2024/0104004 A1     Mar. 28, 2024

(51) Int. Cl.
| | | |
|---|---|---|
| G06F 3/041 | (2006.01) | |
| G06F 3/0488 | (2022.01) | |
| G06F 9/44 | (2018.01) | |
| G06F 11/00 | (2006.01) | |
| G06F 11/28 | (2006.01) | |
| G06F 11/36 | (2006.01) | |

(52) U.S. Cl.
CPC ...... *G06F 11/3684* (2013.01); *G06F 11/3688* (2013.01); *G06F 11/3696* (2013.01)

(58) Field of Classification Search
CPC ............ G06F 11/3688; G06F 11/3684; G06F 11/3696; G06F 16/00; G06F 3/04883; G06F 11/3409; G06F 16/284; G06F 11/3428
See application file for complete search history.

(56) References Cited

U.S. PATENT DOCUMENTS 10,089,217 B2 * 10/2018 Best .................... G06F 11/3692

* cited by examiner

*Primary Examiner* — Thuy Dao
(74) *Attorney, Agent, or Firm* — Mintz Levin Cohn Ferris Glovsky and Popeo, P.C.

(57) ABSTRACT

A method of intelligent accessibility testing includes generating a test case including a plurality of tests, for an application, to test, for the application, compliance with a plurality of accessibility requirements. The method includes generating a plurality of objects. The method includes executing, during generation of the plurality of objects, a first test of the plurality of tests to determine compliance with a first accessibility requirement of the plurality of accessibility requirements. The method includes executing, based at least on the plurality of objects, a second test of the plurality of tests to determine compliance with a second accessibility requirement of the plurality of accessibility requirements. The method includes providing, based on execution of the first test and the second test, a status of the first test and/or the second test indicating the compliance with the plurality of accessibility requirements. Related systems and articles of manufacture are provided.

20 Claims, 9 Drawing Sheets

INTELLIGENT ACCESSIBILITY TESTING

TECHNICAL FIELD

The subject matter described herein relates generally to accessibility testing and more specifically to a voice assisted and object based intelligent accessibility testing.

BACKGROUND

Accessibility testing is the practice of ensuring web and mobile applications, as well as the assistive tools or technologies, are usable to as many people as possible, including those with disabilities, such as vision impairment, hearing disabilities, and other physical or cognitive conditions. In software development, accessibility is an important parameter to be considered. There are various assistive tools or technologies, such as screen reader software, magnification software, special keyboards, etc., enabling accessibility testing. Web and mobile applications can be tested to ensure the web and mobile applications comply with various accessibility standards and other requirements. It can be challenging to integrate accessibility testing within the software development life cycle.

SUMMARY

Systems, methods, and articles of manufacture, including computer program products, are provided for intelligent accessibility testing. In one aspect, there is provided a system. The system may include at least one data processor and at least one memory. The at least one memory may store instructions that result in operations when executed by the at least one data processor. The operations may include: generating a test case for an application. The test case includes a plurality of tests, and the test case is configured to test, for the application, compliance with a plurality of accessibility requirements. The operations also include generating, based at least on the application, a plurality of objects. The operations also include executing, during generation of the plurality of objects, a first test of the plurality of tests to determine compliance with a first accessibility requirement of the plurality of accessibility requirements. The operations also include executing, based at least on the plurality of objects, a second test of the plurality of tests to determine compliance with a second accessibility requirement of the plurality of accessibility requirements. The operations also include providing, based on execution of the first test and the second test, a status of the first test and/or the second test indicating the compliance with the plurality of accessibility requirements.

In some variations, the plurality of objects comprises at least one of a screenshot, a video, and a color contrast value.

In some variations, the plurality of objects are stored for use in executing the second test without accessing the application.

In some variations, the operations further include receiving a nomination of the first test and triggering, based on the receiving, the executing the first test.

In some variations, the first test includes a contrast ratio. The first accessibility requirement includes a contrast ratio threshold.

In some variations, the method comprises removing duplicate objects of the plurality of objects based at least on a comparison between the plurality of objects.

In some variations, the status and the plurality of objects are accessible to a plurality of client devices.

In some variations, the operations further include: receiving, via a user interface of a first client device of the plurality of client devices, an indication of a bug in a first object of the plurality of objects and storing the bug and data associated with the bug collected during the generation of the plurality of objects.

In some variations, the operations further include: executing a third test of the plurality of tests to test compliance with a third accessibility requirement of the plurality of accessibility requirements. The executing includes accessing the application to execute the third test. The third test is executed in parallel with the execution of the second test.

In some variations, the operations further include: generating a recommendation based on the status and the compliance with the plurality of accessibility requirements.

In some variations, a computer-implemented method includes: generating a test case for an application. The test case includes a plurality of tests, and the test case is configured to test, for the application, compliance with a plurality of accessibility requirements. The method also includes generating, based at least on the application, a plurality of objects. The method also includes executing, during generation of the plurality of objects, a first test of the plurality of tests to determine compliance with a first accessibility requirement of the plurality of accessibility requirements. The method also includes executing, based at least on the plurality of objects, a second test of the plurality of tests to determine compliance with a second accessibility requirement of the plurality of accessibility requirements. The method also includes providing, based on execution of the first test and the second test, a status of the first test and/or the second test indicating the compliance with the plurality of accessibility requirements.

A non-transitory computer-readable medium storing instructions, which when executed by at least one data processor, result in operations including generating a test case for an application. The test case includes a plurality of tests, and the test case is configured to test, for the application, compliance with a plurality of accessibility requirements. The operations also include generating, based at least on the application, a plurality of objects. The operations also include executing, during generation of the plurality of objects, a first test of the plurality of tests to determine compliance with a first accessibility requirement of the plurality of accessibility requirements. The operations also include executing, based at least on the plurality of objects, a second test of the plurality of tests to determine compliance with a second accessibility requirement of the plurality of accessibility requirements. The operations also include providing, based on execution of the first test and the second test, a status of the first test and/or the second test indicating the compliance with the plurality of accessibility requirements.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
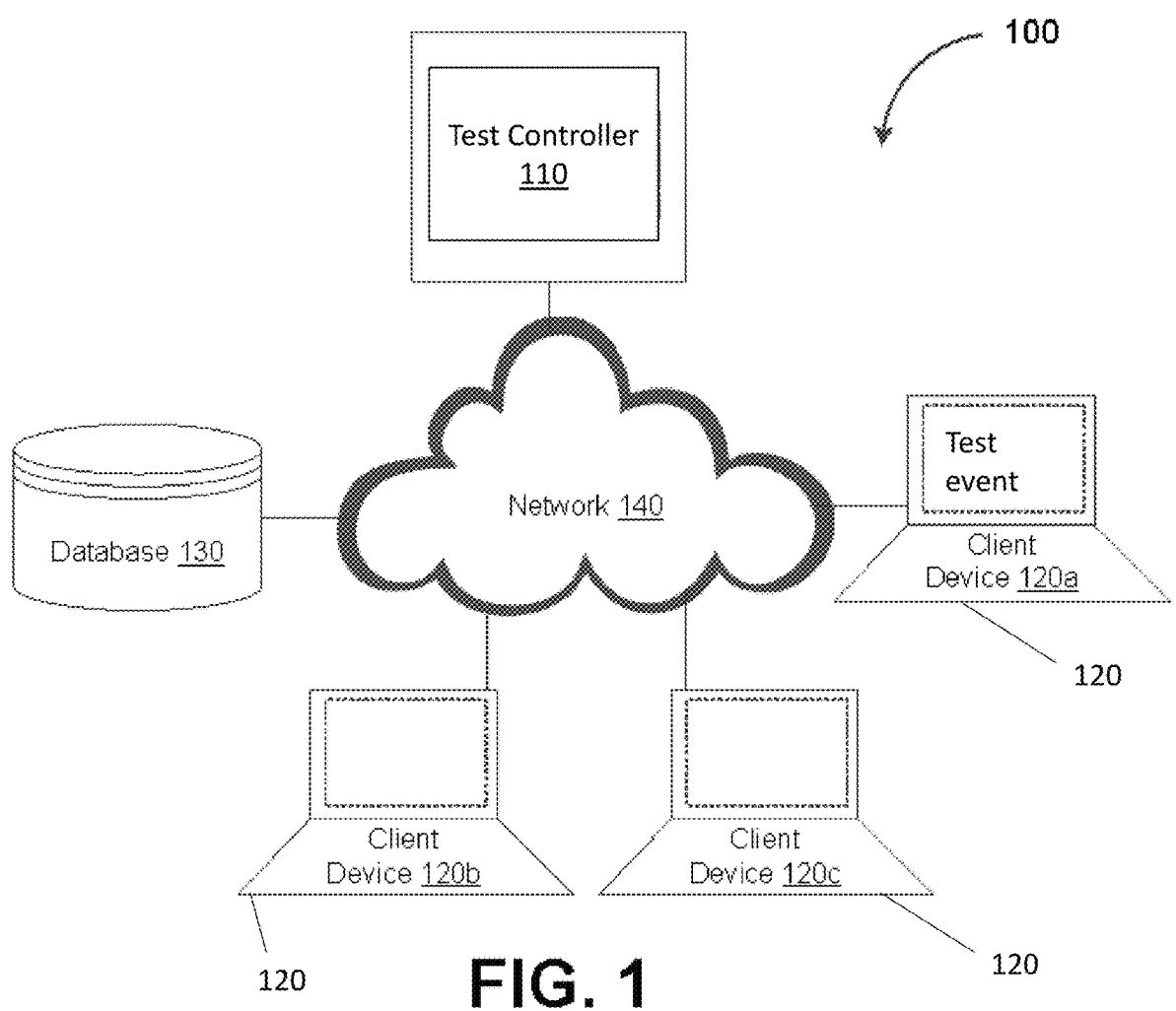
FIG. 1 depicts a system diagram illustrating an accessibility testing system, in accordance with some example embodiments.

Accessibility testing can be performed to test web and mobile applications to ensure the web and mobile applications comply with various accessibility standards and other requirements. Generally, accessibility testing processes are non-standardized. In other words, tests are performed individually, and the results of the tests are not aggregated for each application and/or feature. Thus, it can be a long and difficult process to prepare web and mobile applications for accessibility testing, before the testing is performed.

Further, in preparation for accessibility testing, test coordinators, who generally verify test artifacts for each web and mobile application, may need to log into or otherwise access the application to perform a series of initial checks to rule out any issue with the system, login credentials, roles, and/or authorizations. This consumes a lot of redundant time and resources.

Moreover, quality engineers, who perform the accessibility testing, often face obstacles that extend the amount of time needed to complete the accessibility testing, delay the accessibility testing, and reduce the efficiency of the accessibility testing. For example, quality engineers may often sort through improper test case design with more focus on functionality rather than interface elements, incorrect and/or missing data in test cases, incorrect bug component and/or interface elements to test, accessibility incompatible test cases (e.g., images for illustration in the test case document) that cannot be accessed by specially-abled testers without assistance, and incorrect and/or missing system information, credentials, and roles, leading to unnecessary communications with test case providers. Accordingly, the efficiency of accessibility testing for quality engineers generally depends on many variables, which can lead to major setbacks.

Furthermore, accessibility testing is generally performed using many accessibility testing tools and workflows, which can be scattered across various mediums. As such, it can be difficult to accurately and efficiently monitor the status of accessibility testing, tester assignments, the progress of tests, reporting bugs, and the final status reports. This can lead to reduced efficiency in accessibility testing, with more time and effort spent on peripheral issues, such as tracking down the progress of accessibility tests than the accessibility testing itself.

Consistent with implementations of the current subject matter, the accessibility testing system described herein may provide an intelligent, consolidated, efficient, and/or autonomous platform, which can be used to perform accessibility testing for a web and/or mobile application (also referred to herein as an "application-under-test") and provide a seamless and improved user experience. For example, an application-under-test may provide various functionalities that are invoked via a user interface and/or via voice control. The accessibility testing system may employ test cases including a plurality of tests to test one or more specific functionalities, series of functionalities provided via a user interface, various images provided by the user interface and/or the like.

The accessibility testing system may execute various aspects of test cases (e.g., one or more tests, generate one or more objects, and/or the like) in parallel and/or in an automated, semi-automated, and/or assisted manner. For example, nomination of a test of the test case can trigger execution of the test (e.g., a contrast ratio test) while also generating objects, such as screenshots, videos, color contrast values, etc., as part of execution of the test case and for later use in execution of another test. In other words, the accessibility testing system may generate objects and/or other testing data for use in later executing a test based on those generated objects and/or data. The generated testing data and/or objects may also be accessible to various client devices associated with the accessibility testing platform. The objects may also be referred to herein as "artifacts" or "test artifacts."

At the same time, the accessibility testing system may (e.g., automatically) execute another test. By at least generating the objects and/or testing data during test case execution, the accessibility testing system described herein allows for testing various accessibility requirements without again accessing (e.g., logging into) the application. The accessibility testing system may still allow for accessibility testing over live applications. For example, automated tests may be executed using Voice Assisted Live Test ("VoALT"). Accordingly, the accessibility testing system consistent with implementations of the current subject matter provides a holistic view of the end-to-end accessibility testing activities and to monitor the progress of such accessibility testing at various stages. The accessibility testing system described herein may further generate status reports that can be accessed by a plurality of client devices, regardless of the role of the user associated with the plurality of client devices. Accordingly, the accessibility testing system described herein may assist users by providing a central platform (e.g., the central accessibility test cockpit) that reduces the burden on users in solving peripheral issues, and allowing the users to focus on testing for compliance with accessibility requirements. As noted, the accessibility testing system additionally and/or alternatively provides automated, partially automated, and/or voice assisted testing of the accessibility requirements and applications-under-test.

FIG. 1 depicts a network diagram illustrating an accessibility testing system 100, in accordance with some example embodiments. Referring to FIG. 1, the accessibility testing system 100 may include a test controller 110, a database 130 (described in more detail below with respect to at least FIG. 2), and one or more client devices 140, such as a first client device 120a, a second client device 120b, a third client device 120c, and so on. The test controller 110, the database 130, and the one or more client devices 120 may be communicatively coupled via a network 140. The network 140 may be any wired network and/or a wireless network including, for example, a wide area network (WAN), a local area network (LAN), a virtual local area network (VLAN), a public land mobile network (PLMN), the Internet, and/or the like. Although the accessibility testing system 100 is shown as a remote and/or cloud platform, it should be appreciated that the accessibility testing system 100 may additionally or alternatively be deployed as computer software and/or dedicated circuitry (e.g., application specific integrated circuits (ASICs)) on the client device without departing from the scope of the present disclosure.

The test controller 110 may include at least one processor and/or at least one memory storing instructions configured to be executed by the at least one processor. The test controller 110 may execute or otherwise implement one or more aspects of the accessibility testing system 100, consistent with embodiments of the current subject matter.

The one or more client devices 120 may be a processor-based device including, for example, a smartphone, a tablet computer, a wearable apparatus, a virtual assistant, an Internet-of-Things (IoT) appliance, and/or the like. The one or more client devices 120 may provide access to the test event, the application-under-test, the test case, the one or more tests, and/or the like, such as via a browser, or other software program running on the one or more client devices 120. As described herein, the application-under-test includes a mobile and/or web application, an application service, a cloud service, and/or the like. The one or more client devices 120 may include a first client device 120a, a second client device 120b, a third client device 120c, and the like. As an example, the application-under-test is shown as application-under-test 250 in FIG. 2.

Figure 2:
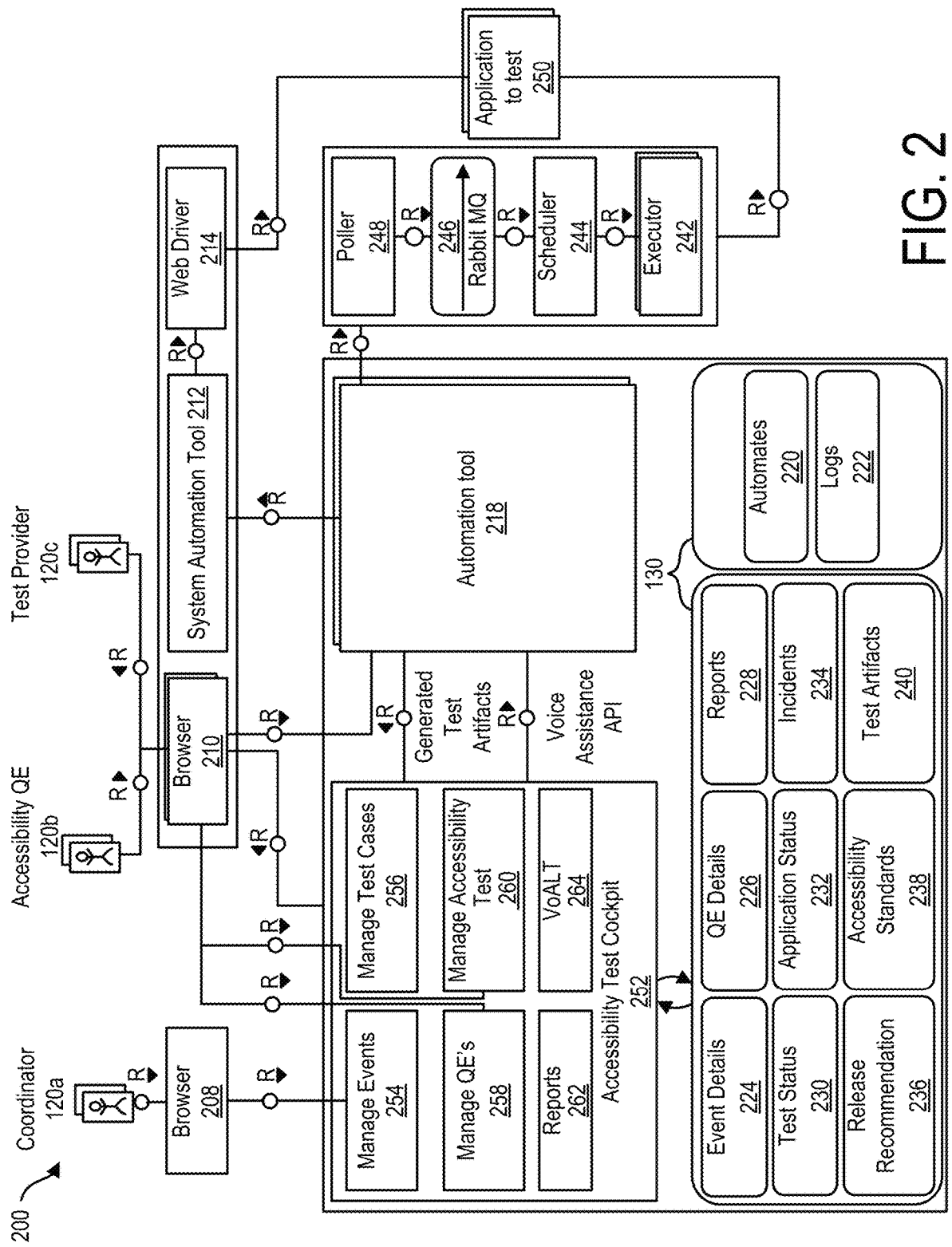
FIG. 2 depicts a block diagram illustrating an example of the accessibility testing system, in accordance with some example embodiments.

FIG. 2 depicts a block diagram illustrating an example of the accessibility testing system 100, in accordance with some example embodiments. As shown in FIG. 2, the accessibility testing system 100 includes the first client device 120a, the second client device 120b, and the third client device 120c. The first client device 120a, the second client device 120b may each be associated with users having different roles, such as a test coordinator, an accessibility quality engineer, a test provider, and/or the like. In this example, the first client device 120a is associated with the test coordinator, the second client device 120b is associated with the accessibility quality engineer, and the third client device 120c is associated with the test provider.

Various aspects of the accessibility testing described herein may be performed using at least one of the one or more client devices 120 based on the role associated with the user using the corresponding client device. In some embodiments, however, the status of the accessibility testing (e.g., the generated reports), objects generated during the accessibility testing, and/or testing data generated during the accessibility testing may be accessible to each of the one or more client devices 120 regardless of the role associated with the user using the particular client device. Accordingly, the accessibility testing system 100 may provide a consolidated central platform for use by a plurality of client devices 120 and a plurality of roles associated with the one or more client devices 120.

Referring to FIG. 2, the accessibility testing system 100 may further include an accessibility test cockpit 252 and an automation tool 218. The first client device 120a, the second client device 120b, and the third client device 120c may use one or more portions of the accessibility test cockpit 252 and/or the automation tool 218 based on the role associated with the first client device 120a, the second client device 120b, and the third client device 120c. For example, the user (e.g., the test coordinator, the accessibility quality engineer, and/or the test provider) may log into a web browser (e.g., web browser 208 of the first client device 120a and/or the web browser 210 of the second or third client devices 120b, 120c) using one or more credentials or other log in information associated with the user. The second client device 120b and/or the third client device 120c may additionally and/or alternatively provide access to a system automation tool 212 and/or a web driver 214.

Based on the received credentials and/or other log in information, the test controller 110 may authenticate the particular user and/or associated client device 120 for accessing one or more applications of the accessibility test cockpit 252 and/or the automation tool 218. Thus, the test controller 110 may implement role-based authorization to provide access to the one or more client devices 120 to one or more applications of the accessibility test cockpit 252. For example, the test controller 110 may provide authorization to the test coordinator, via the first client device 120a, to access the manage events application 254 of the accessibility test cockpit 252. Additionally and/or alternatively, the test controller 110 may provide authorization to the accessibility quality engineer, via the second client device 120b, to access the manage quality engineer application 258 and/or the manage accessibility test application 260 of the accessibility test cockpit 252. Additionally and/or alternatively, the test controller 110 may provide authorization to the test provider, via the third client device 120c, to access the manage test cases application 256 of the accessibility test cockpit 252. While the test controller 110 provides role-based authorization for performing one or more actions using the accessibility test cockpit 252, the status of the accessibility testing (e.g., the generated reports), objects generated during the accessibility testing, and/or testing data generated during the accessibility testing may be accessible to each of the users, such as via the first client device 120a, the second client device 120*b*, and/or the third client device 120*c*, regardless of the role associated with the user using the particular client device. This allows for progress of the accessibility testing to be quickly and efficiently monitored.

After authorization is provided by the test controller 110, the test controller 110 may receive, via the one or more client devices 120 one or more instructions and/or commands associated with the accessibility testing for the application-under-test, such as via one or more applications of the accessibility test cockpit 252. For example, the one or more instructions and/or commands may include a request to generate a test event for one or more applications-under-test, selection of one or more test cases for execution corresponding to the one or more applications-under-test, selection of one or more tests for testing the accessibility of the applications-under test as part of execution of a test case, selection of one or more objects for testing, an indication of one or more bugs in the one or more objects, and/or the like.

The accessibility test cockpit 252 provides a central platform via which the users, via the one or more client devices 120, may initiate one or more steps of the accessibility testing. The accessibility test cockpit 252 is available to users, via the one or more client devices 120, to enable the complete end-to-end process for the accessibility testing for all applications-under-test. The accessibility test cockpit 252 may be a launch pad including a plurality of applications having different functionalities and/or access-levels. For example, the accessibility test cockpit 252 includes one or more applications that may receive one or more commands to perform at least a portion of the accessibility testing. The one or more applications include a manage events application 254, a manage test cases application, a manage quality engineers application 258 (also referred to herein as a manage testers application), a manage accessibility test application 260, a reports application 262, and a VoALT application 264. In some embodiments, the manage events application 254, the manage test cases application 256, the manage quality engineers application 258, and/or the manage accessibility test application 260 are role-based applications for which the test controller 110 authorizes access. In some embodiments, the reports application 262 may be accessed to any of the client devices 120, regardless of access. As described herein, this allows for quick and efficient monitoring of the progress of the accessibility testing.

Figure 3:
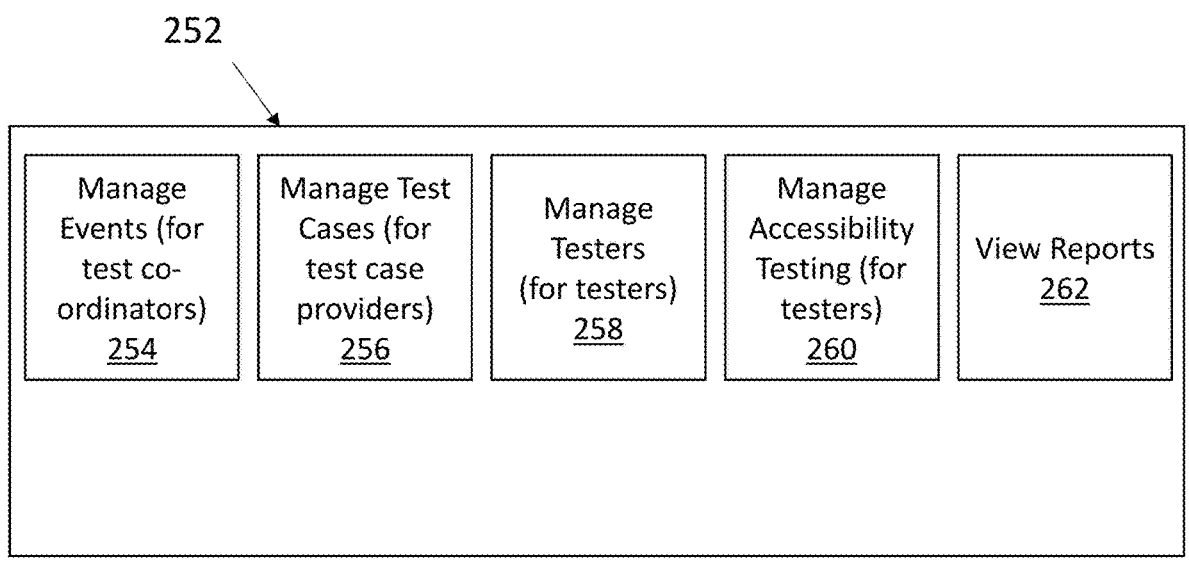
FIG. 3 depicts an example user interface for an accessibility test cockpit, in accordance with some example embodiments.

FIG. 3 illustrates an example user interface accessible to one or more users (e.g., the test coordinator, test case providers, and/or testers), such as via the browser 208, 210 of a client device 120. The user interface may include a plurality of input elements including, for example, a first tile corresponding to the manage events application 254, a second tile corresponding to the manage test cases application 256, a third tile corresponding to the manage testers application 258, a fourth tile corresponding to the manage accessibility testing application 260, and a fifth tile corresponding to the view reports application 262.

The manage events application 254 may be accessible to the first client device 120*a* (e.g., for use by the test coordinator). The manage events application 254 allows for generation of a test event. The test event may be generated for a software release for a software program that includes one or more applications. The test event may be created to test and/or determine compliance of the one or more applications, such as one or more applications-under-test, for compliance with a plurality of accessibility requirements for the software release. The test event may include a plurality of test cases for testing a corresponding application-under-test, such as via the browser 210, for compliance with a plurality of accessibility requirements. As described herein, the accessibility requirements may include one or more accessibility standards (e.g., local and/or international standards). The accessibility requirements may be retrieved from one or more web content accessibility guidelines. As noted, the each of the plurality of test cases corresponds to an application-under test. For example, the test case may include one or more tests for testing the application-under-test associated with the particular test case. The test case may additionally and/or alternatively include the standards and/or accessibility requirements that are tested during the one or more tests.

Generally, a test coordinator, such as via the first client device 120*a*, may create a test event for a release cycle of a software program including one or more applications-under test. The test events may be created via the manage events application 254. The test events application 254 may allow, depending on the role of the user, for test events to be accessed, selected, created, edited, copied, deleted, and/or the like.

The manage test cases application 256 allows for nomination (e.g., by a test case provider) of an application (e.g., the application-under-test) for accessibility testing for a test event. The manage test cases application 256 can be used to create and/or select one or more test cases for testing the corresponding application-under-test. The one or more test cases may be validated prior to being executed. In some embodiments, a plurality of test cases can be nominated and/or executed to test a single application-under-test. The manage test cases application may provide access, such as to the test provider via the third client device 120*c*, to the nominated plurality of test cases.

The manage testers application 258 provides a list of the tests nominated for an event. The manage testers application 258 issues a request to the tester (e.g., the accessibility quality engineer) to nominate themselves to use one or more of the nominated test cases to test the accessibility of the application-under-test.

The manage accessibility testing application 260 may provide a testing status for each of the nominated test cases and/or corresponding applications-under-test. The manage accessibility testing application 260 may receive an indication to begin testing via one or more of the test cases, of the application-under-test. The indication may be a nomination of a test case, in which case the triggering of the execution may be automatic. The indication may additionally and/or alternatively be received via a user interface, such as a user interface of the third client device 120*c*.

The view reports application 262 may generate one or more reports showing a status of the plurality of test cases and/or the accessibility testing of the application-under-test. For example, the status may indicate compliance of an application-under-test with the corresponding accessibility standards, based at least on execution of one or more tests of a test case corresponding to the application-under-test. The view reports application 262 may consolidate the results of the accessibility testing when the testing status is updated. While intermediate results can be viewed for a test event, the test controller 110 may provide a final release recommendation (described in more detail here) when execution of all of the nominated tests cases and/or tests of the nominated test cases are completed for a particular application-under-test.

Referring back to FIG. 2, the test controller 110, via one or more applications of the accessibility test cockpit 252, may invoke the automation tool 218 to communicate with one or more tools of the accessibility testing system 100 and/or to launch the application-under-test 250 for testing in the browser 210. The one or more tools may include a poller 248, a message broker 246, a scheduler 244, and an executor 242. The one or more tools may be used to execute one or more test cases and/or one or more tests of the one or more tests cases to test compliance of the application-under-test 250 with a plurality of accessibility requirements, as described herein. For example, consistent with embodiments of the current subject matter, the automation tool 218 may communicate with the one or more tools to execute at least one test (e.g., a contrast ratio test) and/or generate one or more objects or other testing data based on the application-under-test 250 for later use. Additionally and/or alternatively, the automation tool 218 may communicate with the one or more tools to execute at least one test (e.g., the VoALT test) that relies on access to the application-under-test 250.

The generated objects and/or other testing data may be stored in the database 130. For example, the database 130 may store testing data or other information generated during the execution of one or more test cases and/or one or more tests for later use during the execution of one or more other test cases and/or tests. The database 130 may additionally and/or alternatively store generated testing data for later use in generating one or more reports, recommendations, and/or the like. Referring to FIG. 2, the database 130 may be communicatively coupled to the accessibility test cockpit 252. The database 130 may include event details 224 (e.g., the one or more generated testing events and/or associated details), quality engineer details 226 (e.g., authorization information associated with the accessibility quality engineer at the second client device 120b), reports 228 (e.g., generated reports and/or data associated with the reports generated via the reports application 262), test status 230 (e.g., a compliance with the tests of the test case for the application-under-test), application status 232 (e.g., a status of the application-under-test, such as whether the application-under-test has passed or failed the one or more test cases and/or tests), incidents 234 (e.g., one or more bugs generated during the execution of the one or more tests), release recommendations (e.g., one or more recommendations generated by the test controller 110 based on the accessibility testing), accessibility standards 238 (e.g., one or more accessibility requirements, such as one or more thresholds, etc., for use in execution of the tests), and test objects 240 (e.g., one or more generated objects including screenshots, videos, color contrast values, and/or the like). The database 130 may include automates 220 and/or logs 222 generated by the automation tool 218.

Figure 4:
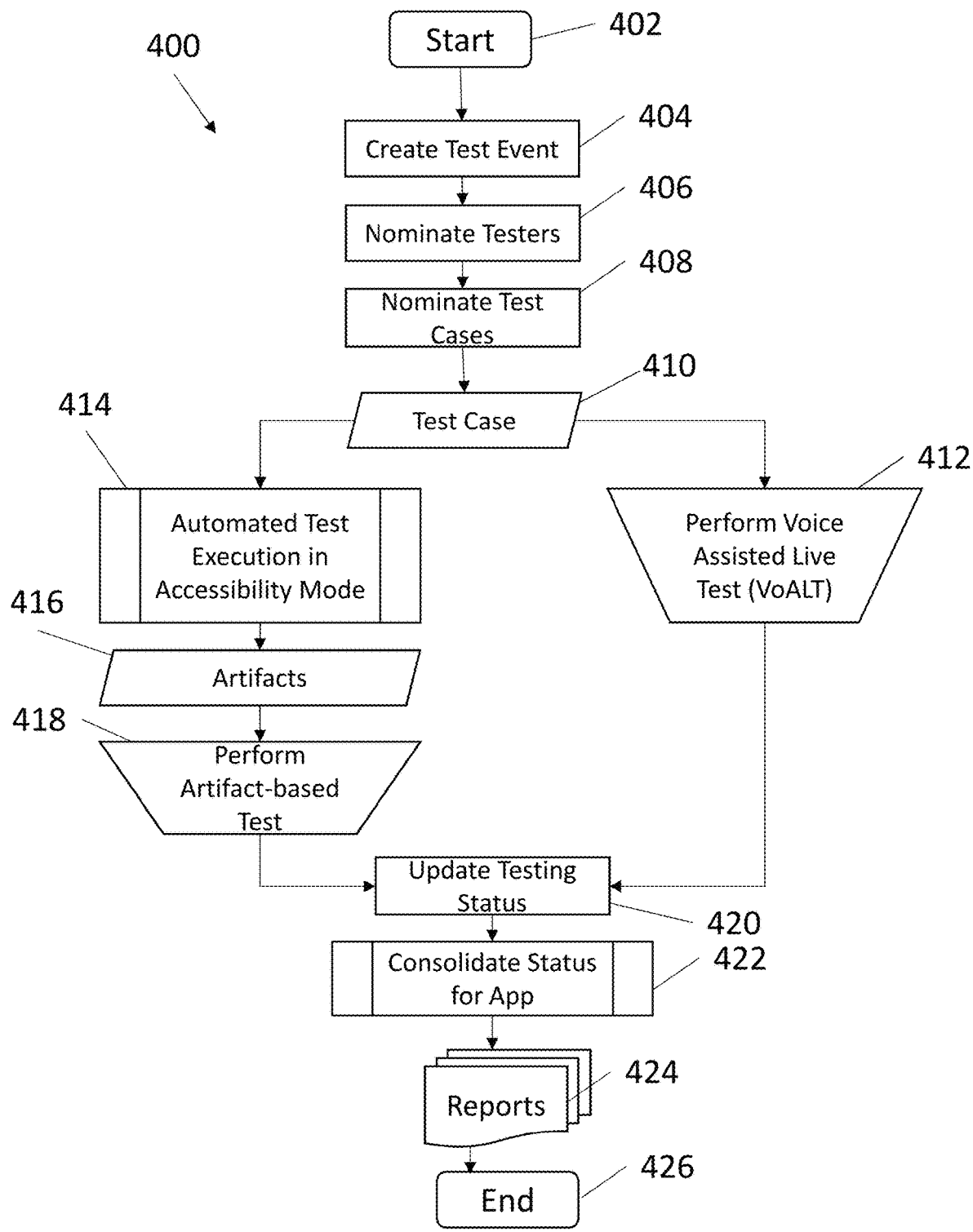
FIG. 4 depicts an example workflow for the accessibility testing system, in accordance with some example embodiments.
Figure 5:
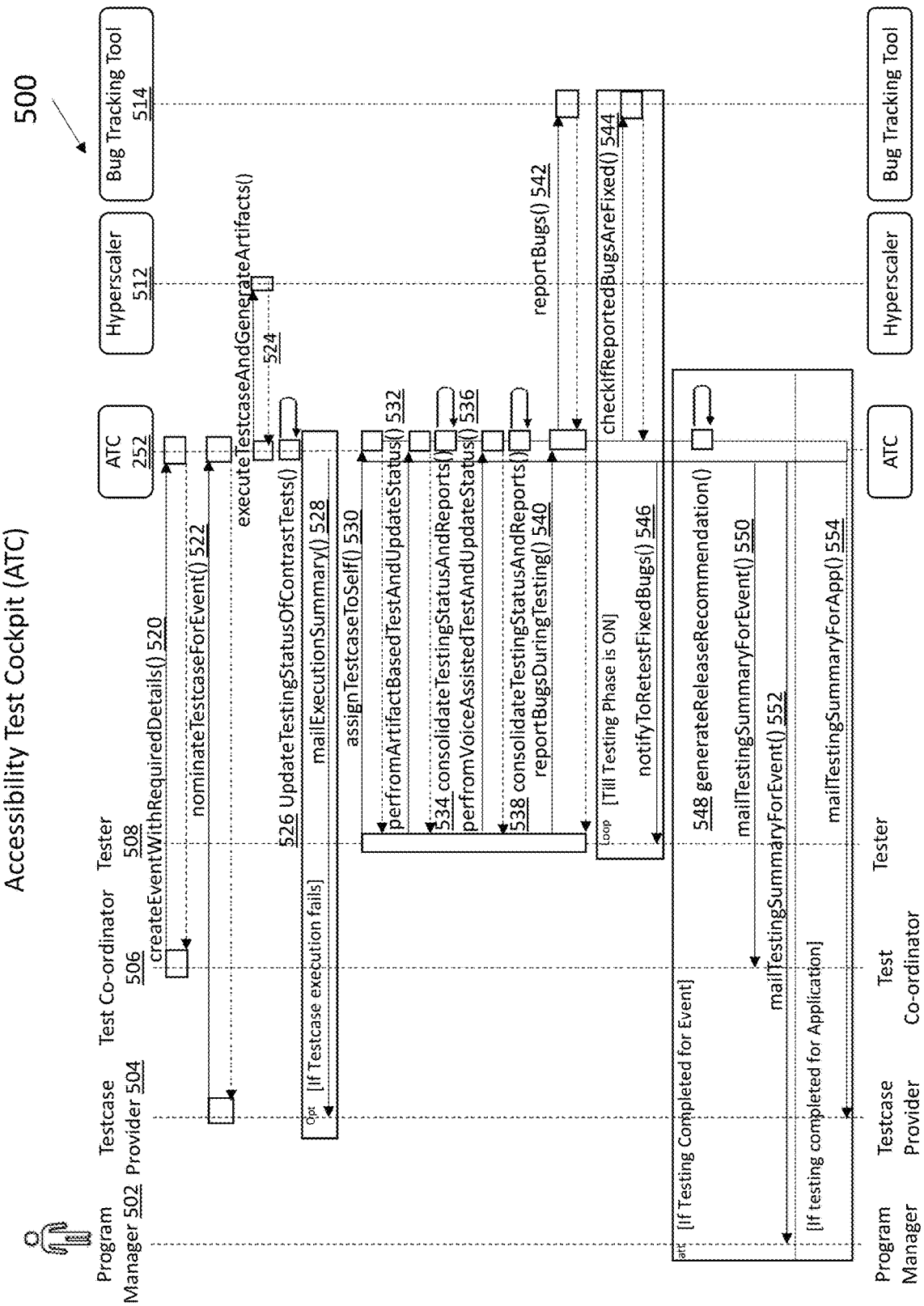
FIG. 5 depicts an example swim lane diagram, in accordance with some example embodiments.

FIG. 4 depicts an example workflow 400 for the accessibility testing system, in accordance with some example embodiments. FIG. 5 depicts an example swim lane diagram 500, in accordance with some example embodiments. The swim lane diagram includes communications (e.g., commands, etc.) between a test coordinator 506 associated with the first client device 120a, an accessibility quality engineer (e.g., tester) 508 associated with the second client device 120b, a test provider 504 associated with the third client device 120c, a program manager 502 associated with another one of the client devices 120, the accessibility test cockpit 252, and one or more tools, such as a hyperscaler 512 and a bug tracking tool 514, used in communication with at least the automation tool 218 and/or the test controller 110. An example process for accessibility testing of an application-under test is described herein with reference to FIG. 4 and FIG. 5.

Referring to FIG. 4, at 402, the accessibility testing may begin.

At 404, the test controller 110 may generate a test event for a software release for a software program that includes one or more applications-under-test. The test event may be created to test and/or determine compliance of the one or more applications-under-test for compliance with a plurality of accessibility requirements for the software release. For example, at 520, the test controller 110 may receive, from the first client device 120a (e.g., the test coordinator 506) a command to generate the test event to test compliance of the software program with a plurality of accessibility requirements. The test coordinator 506 may access the manage events application 254 to generate the test event. The test event may be created for release cycles for the software program. For example, a unique test event may be created for each release cycle for a software program. In some embodiments, the test event includes deadlines for automated test case nomination, accessibility requirements to be tested, and/or the like.

At 406, one or more testers may be nominated. For example, the test controller 110 may receive a nomination of a tester 508 (e.g., an accessibility quality assurance engineer) via the client device 120 associated with the tester 508. The tester 508 may nominate themselves for the generated test event.

At 408, at least one test case may be nominated. For example, at 522 (see FIG. 5), the test controller 110 may receive a nomination of at least one (e.g., one, two, three, four, five, or more) test case for the test event. For example, the test controller 110 may receive a command to include at least one test case in the test event. The test provider 504 may nominate the at least one test case for inclusion in the test event via the manage test cases application 256.

At 410, the at least one test case may include one or more tests, such as a contrast ratio test, a voice test, an artifact- or object-based test, and/or the like. In some embodiments, at least one of the tests are automated and may not be included in the test case, such as the contrast ratio test. Generally, product teams register the automated tests for the applications-under-test. In some embodiments, test cases that have been executed successfully in the accessibility testing system 100 for the previous execution can be nominated. In some embodiments, each test case includes a quantity of procedural steps that is less than a threshold amount for efficient testing. For example, the test case may include less than 35 steps, 5 to 10 steps, 10 to 20 steps, 20 to 30 steps, 30 to 40 steps, 40 to 50 steps, and/or the like. The test cases may additionally and/or alternatively include one or more standards for testing, using the one or more tests, the accessibility requirements associated with the corresponding application-under-test.

At 414, at least one test case can be executed (e.g., automatically) in accessibility mode. For example, successful nomination of the at least one test case may trigger execution of the test case. This includes execution of a first test of the one or more tests of the test case, such as via the hyperscaler 512. Additionally and/or alternatively, this includes execution of a contrast ratio test, which may be included in the one or more tests. In some embodiments, the accessibility requirements may be run manually by accessibility quality assurance engineers over a live application. However, at least one test can be executed without signing-in to the application. The at least one test can be run automatically in accessibility mode.

At 524, the test controller 110 may execute a first test or testing mode to test compliance with a first accessibility requirement. In some embodiments, the first test includes a contrast ratio test (e.g., an automatic contrast test). During execution of the contrast ratio test, the test controller 110 compares a contrast ratio of a screen (e.g., a user interface) of the application-under-test or an element displayed on the screen of the application-under-test to a threshold contrast ratio. In this example, the first accessibility requirement includes the threshold contrast ratio, a minimum contrast, and/or a color contrast setting, according to one or more accessibility standards.

The test controller 110 determines whether the application-under-test passes or fails the contrast ratio test based on whether or not the contrast ratio of the application-under-test meets the threshold contrast ratio. In some embodiments, the threshold contrast ratio is a number of standard deviations from a standard contrast ratio.

For example, the contrast ratio test can be automatically tested. In other words, the test controller 110 may read one or more CSS/color properties of the controls on the screen of the application-under-test and compares the color properties against the background according to the accessibility requirements. In particular, the test controller 110 may determine and compare a color contrast for one or more unique controls, images, texts, and/or combinations thereof. The test controller 110 may execute color contrast determination as a service, which obtains all control and background colors and returns the color contrast of every property in the request. Additionally and/or alternatively, the test controller 110 implements (e.g., invokes) a color contrast identifier tool integrated with the automation tool 218 to obtain the color contrast. In some embodiments, any color contrast ratio, with its red-green-blue (RGB) value to its background RGB value, can be used by the test controller 110 to execute the first test (e.g., the color contrast ratio test) by, for example, using the below function in Table 1.

TABLE 1

```
function luminance (r, g, b) {
    var a = [r, g, b].map(function (v) {
        v /= 255;
        return v <= 0.03928
            ? v / 12.92
            : Math.pow( (v + 0.055) / 1.055, 2.4 );
    });
    Return a[0] * 0.2126 + a[1] * 0.7152 + a[2] * 0.0722;
}
function contrast (rgb1, rgb2) {
    var lum1 = luminance(rgb1[0], rgb1[1], rgb1[2]);
    var lum2 = luminance(rgb2[0], rgb2[1], rgb2[2]);
    var brightest = Math.max(lum1, lum2);
    var darkest = Math.min(lum1, lum2);
    return (brightest + 0.05)
        / (darkest + 0.05);
}
```

At 524 (see FIG. 5) and at 416 (see FIG. 4), the test controller 110 may also, during execution of the at least one test case (e.g., during execution of the first test), such as during execution of the contrast ratio test, and based on (e.g., by accessing) the application-under-test, a plurality of objects including at least one of a screenshot, a video, a color contrast ratio, a CSS property, a tooltip, and/or the like. The plurality of objects may be stored for later testing of another one (e.g., another accessibility test) of the one or more tests, such as via the accessibility test cockpit 252. The at least one test case may be executed one or more times to obtain the plurality of objects. The test controller 110 may execute the first test and/or generate the plurality of objects (e.g., during execution of the at least one test case and/or at the same time as execution of the first test) by at least sending a command to the hyperscaler 512. The hyperscaler 512 may receive the command and execute the at least one test case, execute the first test, and/or generate the plurality of objects.

In some embodiments, such pre-generated objects can be used in testing, eliminating dependencies and inefficiencies in accessibility testing such as dependencies on system availability, user actions, and/or user roles. In some embodiments, at least some of the pre-generated objects can be discarded. For example, the test controller 110 may remove duplicate objects of the plurality of objects based at least on a comparison between the plurality of objects. For example, the test controller 110 may compare the plurality of generated objects stored in the database 130. The test controller 110 may remove at least one (e.g., one, two, three, four, five, or more) object of the plurality of objects based on a determination that the at least one object is within a similarity threshold (e.g., at least a 95% match, a 90% match, an 85% match, or the like) of another one of the plurality of objects. The test controller 110 may compare one or more colors, color contrast ratios, pixel-wise representations, and/or the like to determine whether any of the plurality of objects are within the similarity threshold.

The test controller 110 may, using a machine learning model trained to predict a similarity score, determine whether any of the plurality of objects should be removed. For example, the machine learning model may be trained based on one or more annotations of one or more objects, indicating one or more features of the one or more objects. The machine learning model may extract, from the plurality of objects, one or more features, such as pixel-wise features. The machine learning model may compare the extracted features from at least two of the plurality of objects to determine a similarity score. In some implementations, the machine learning model predicts the similarity score based on a segmented object, clustering one or more features from the plurality of objects, and/or the like. The machine learning model may additionally and/or alternatively predict the similarity score based on a quantity of extracted features from one object matching (e.g., exactly and/or within a threshold) extracted features from another object. In some embodiments, the plurality of objects can be removed (e.g., automatically) based on the predicted similarity score, such as when the predicted similarity score meets a threshold score. Removal of the at least one object improves testing efficiency and reduces computing resources.

At 526, the test controller 110 may update the testing status of the at least one test case indicating compliance with a plurality of accessibility requirements included in the test case and/or the test event. In an example, the test controller 110 updates the status, in the database 130, of the at least one test case. The status includes whether the application-under-test passed or failed the first test and/or a progress of the first test execution. For example, the test controller 110 may update the testing status as failed when the determined contrast ratio of a screen or element of the screen of the application-under-test fails to meet the threshold contrast ratio. Alternatively, the test controller 110 may update the testing status as passed when the determined contrast ratio of a screen or element of the screen of the application-under-test meets the threshold contrast ratio. In some embodiments, the testing status includes the status (e.g., pass or fail) for each object, screen, and/or the like tested according to each accessibility requirement, as described herein. The reports generated as described herein may be automatically updated based on the testing status.

At 528, the test controller 110 may send a message to the test provider 504 via the associated client device 120. For example, the test controller 110 may send an execution summary to the test provider 504 when the test controller 110 determines the application-under-test fails the first test.

At 530, the test controller 110 receives an indication of the assignment of a second test or testing mode to the tester 508, such as by the tester 508. At 532, the test controller 110 executes a second test to test compliance with a second accessibility requirement. For example, the test controller 110, at 418 (see FIG. 4), may execute an object-based test (e.g., the second test).

In some embodiments, execution of the second test (e.g., the object-based test) is at least partially automated. For example, the test controller 110 may test the second test (e.g., as part of execution of the at least one test case) without logging into the application-under-test based on the stored and/or pre-generated objects. In some embodiments, the tester 508 selects the test case which he/she is assigned to and selects the test case to test, and the test controller 110 receives the selection. The objects generated for each nominated test case may be compared against the corresponding accessibility requirement, such as via a "Perform Accessibility Testing" user interface.

Figure 6:
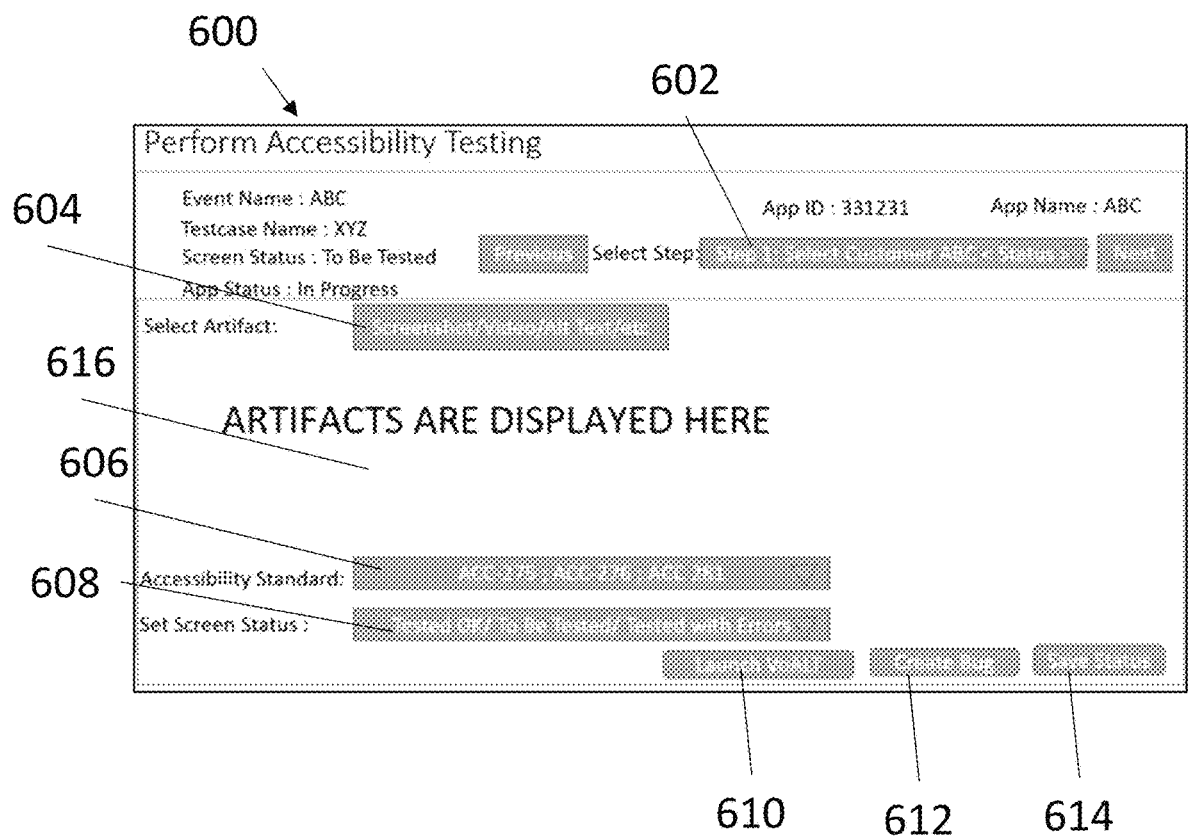
FIG. 6 depicts an example user interface, in accordance with some example embodiments.

FIG. 6 illustrates an example of the "Perform Accessibility Testing" user interface 600 according to embodiments of the current subject matter. The user interface 600 includes a plurality of user selectable elements, such as element 602, element 604, element 606, element 608, element 610, element 612, and element 614. Selection of "select step" element 602 may cause selection of a particular step of the second test to test. The element 604 can be selected to choose a particular object from the pre-generated and/or stored objects 240 in the database 130. The test controller 110 displays the selected object in display region 616.

The element 606 can be selected to choose one or more accessibility requirements (e.g., standards) for comparison against the selected object. For example, below is a table including at least one accessibility standard (on the left) that can be tested with the corresponding generated objects 240 (on the right):

tested," "tested with error," and/or the like. The element 610 can be selected to launch a third test (e.g., VoALT) or testing mode.

The element 612 can be selected to create a bug including an error or discrepancy in the object compared to the selected accessibility requirement. For example, the user interface 600 may receive an indication (e.g., selection) of the bug in the object. The bug and/or data (e.g., other data associated with the object) may be stored for report generation. The detailed description of the bugs may be prefilled with application, test case, and/or step details and/or with associated links or attachments. The element 614 may be selected to save a status of the execution of the third test, including a comparison of one or more of the selected objects. Thus, the user interface 600 provides a simple interface for quickly and efficiently executing and/or testing the second test (e.g., another accessibility test).

At 420, the test controller 110 may update a testing status of the compliance of the one or more tests for the application-under-test based on the first test and/or the second test. For example, the test controller 110 may update the testing status 430 in the database 130. At 534 (see FIG. 5) and at 422 (see FIG. 4), the test controller 110 consolidates the testing status and results of executing the previously executed tests, including the first test and/or the second test, for report generation.

At 536, the test controller 110 executes a test to determine compliance with a third accessibility requirement. For example, the test controller 110, at 412 (see FIG. 4), may execute a voice assisted live test (VoALT). In some embodiments, the test controller 110 determines to execute the VoALT test based on receipt of a user selection, such as via the user interface 600 and/or the accessibility test cockpit 252. In some embodiments, the test controller 110 determines to execute the third test based on receipt of a user selection, such as via the accessibility test cockpit 252. The VoALT may be tested over a live application (e.g., in contrast to execution of the object-based testing, which may be tested based on objects without accessing the live application).

TABLE 2

| Accessibility Standard | Object Used for Testing |
| --- | --- |
| Labels | Page-wise screenshots |
| Screen Titles | Page-wise screenshots. Browser title for tab is captured separately. |
| TextResizingupto200percent | Zoomed screenshots for each page |
| ConsistentNavigation | Page-wise screenshots |
| MultipleWaystoFindContent | Page-wise screenshots |
| AvoidanceofFlickeringandFlashingContent | Short video or regular screenshots at time intervals. |
| ResponsiveDesign | Different resolutions screenshots for each page |
| Text Alternative for Non-Text Content | The alternate text is available for non-text content with screenshot |
| Two-Senses Concept | Page-wise screenshots |
| Purpose and Target of a Reference | Page-wise screenshots |
| Consistent Use of Identical UI-Elements | Page-wise screenshots |
| Accessible Alternatives | Page-wise screenshots |
| Display Orientation | Page-wise screenshots in portrait and landscape mode of application |
| Error Prevention | Page-wise screenshots |

Figure 7:
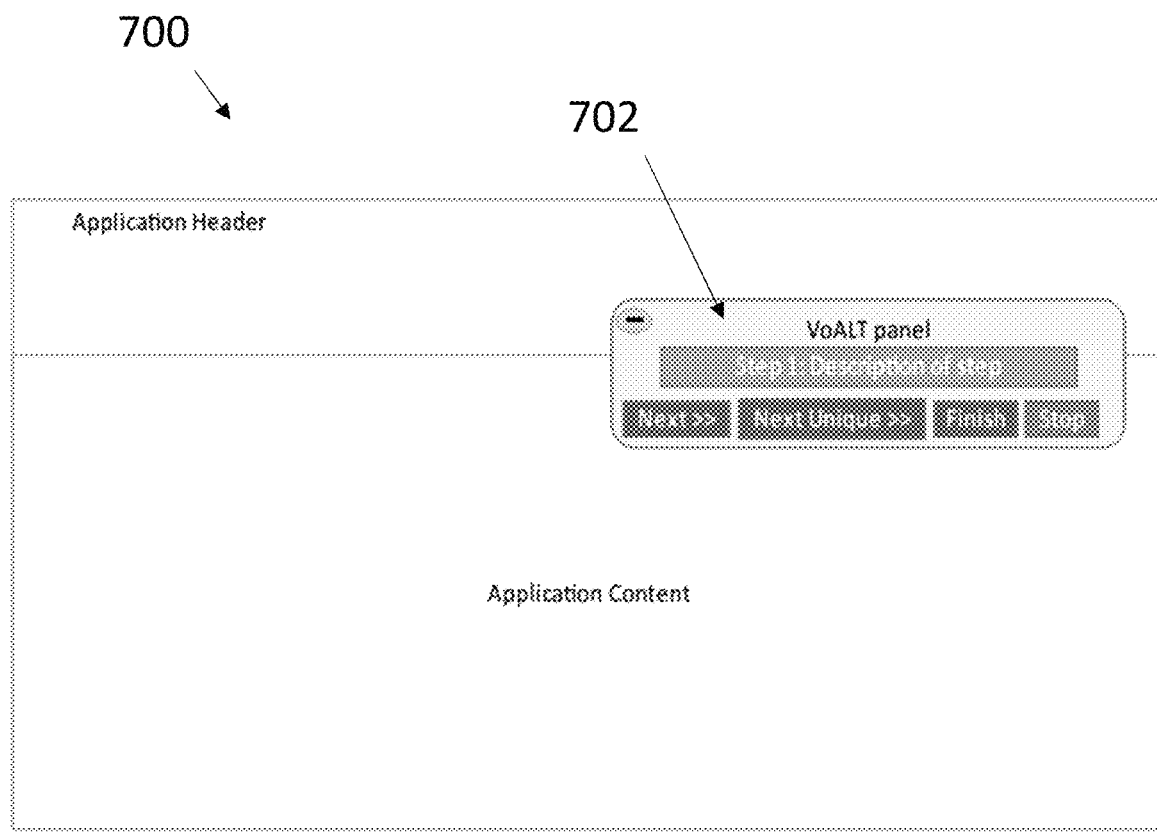
FIG. 7 depicts an example user interface, in accordance with some example embodiments.

Referring again to FIG. 6, the element 608 can be selected to set a screen status based on the comparison. For example, the element 608 can be selected as "tested ok," "to be FIG. 7 illustrates a user interface 700 for executing the VoALT test. As shown in FIG. 7, the user interface 700 includes a draggable and minimizable VoALT panel 702.

The VoALT panel 702 may be selected by the tester 508 and/or launched with the application-under-test to issue voice commands during the test execution to work in unison with a screen reader. In some embodiments, icons in the VoALT panel 702 may be selected to provide instructions to navigate as an alias of voice command. Additionally and/or alternatively, the VoALT panel 702 may help visually differently abled quality experts to issue voice commands to navigate to the appropriate screen to perform the desired test. The VoALT panel 702 can be selected to move to a next action. This allows the testers to execute on actual accessibility test requirements rather than understanding and navigating the application-under-test, improving the user experience. For example, the VoALT panel 702 may not require the tester to locate the desired data. Thus, the VoALT panel 702 reduces the amount of time testers spend communicating with other personnel. The voice command reader may be invoked by the automation tool and may respond to the tester with a voice of choice. The voice command reader may allow the tester to execute a test, such as the VoALT test. Additionally and/or alternatively, the voice command reader may allow the testers to perform one or more actions via the accessibility test cockpit 252. Additionally and/or alternatively, the voice command reader may handle the credentials to login and the required roles for the user. The voice command reader may additionally and/or alternatively define the scope within the application to test To execute the VoALT test, the test controller 110 may implement a speech recognition API, which recognizes the tester's speech and converts the speech to text. The API may additionally and/or alternatively search for key terms, which are classified and grouped with pre-defined actions. Once the user words are mapped, categorized and sequenced, corresponding tool actions may be invoked by the test controller 110. The same or different API may translate back the response words of the tools action to speech with desired capabilities, such as voice, volume, accent, and/or the like.

At 420, the test controller 110 may update a testing status of the compliance of the application-under-test based on the first test, the second test, and/or the third test. For example, the test controller 110 may update the testing status 430 in the database 130. At 538 (see FIG. 5) and at 422 (see FIG. 4), the test controller 110 consolidates the testing status and results of executing the previously executed tests, including the first test, the second test, and/or the third test, for report generation.

At 540, the test controller 110 reports bugs indicated during testing, such as during execution of the second test (e.g., the object-based testing). At 542, the test controller 110 creates the bug. The test controller 110 (e.g., via one or more APIs, such as in connection with the automation tool 218) create the bug at the bug tracking tool 514. The message may include the bug and the pre-populated corresponding data associated with the bug. At 544, the test controller 110 (e.g., via the poller 248) determines whether the bugs have been fixed. For example, the test controller 110 may send a request to the bug tracking tool 514 to obtain an updated status of the particular bug. The test controller 110 may receive the updated status, including an indication that the bug has been fixed. The test controller 110 (e.g., via the poller 248) may have a continuous polling on the bug tracking tool 514 for open bugs. When any bug is resolved, the assigned tester 508 may be automatically notified. For example, at 546, based on receipt of the indication the bug has been fixed, the test controller 110 sends a notification to the tester 508. The test controller 110 may then retest the object to determine whether there are any other bugs and/or to confirm that the bug has been fixed, at step 532.

Referring to FIG. 4, at 424, the test controller 110 may generate a report including a status of the tests included in the test case. For example, each unique page of application-under-test has a testing status for each accessibility standard (e.g., requirement). Once the testing is completed with completely automated contrast test, Artifact-based testing (ABT) (e.g., object-based testing), and/or VoALT, results from the tests may be consolidated per automate, per application, and/or per accessibility standard. The reports including the results may be generated and stored in the database 130 as reports 228. The reports may be accessed via the accessibility test cockpit. The reports 228 may be in expected formats.

Referring to FIG. 5, at 548, the test controller 110 may generate a release recommendation. For example, the test controller 110 generates the release recommendation based on the results of the tests of the test case. The test controller 110 may generate one or more recommendations for bringing the application into compliance with the plurality of accessibility requirements. For example, the test controller 110 generates a release recommendation based on the success criteria (defined at the test event level). The release recommendation may be dynamic. For example, the test controller 110 may update the release recommendation as the tests of the test case are executed. Additionally and/or alternatively, the test controller 110 may update the release recommendation when one or more of the indicated bugs are fixed.

The release recommendation can be stored as release recommendation 236 and accessed via the accessibility test cockpit 252. The test controller 110 may send a summary of the test event to the test coordinator 506, at 550, to the program manager 502, at 552, and/or to the test case provider. The test controller 110 may additionally and/or alternatively send a summary of the testing for the application-under test to the program manager 502, at 554. Referring again to FIG. 4, at 426, the accessibility testing may end.

Figure 8:
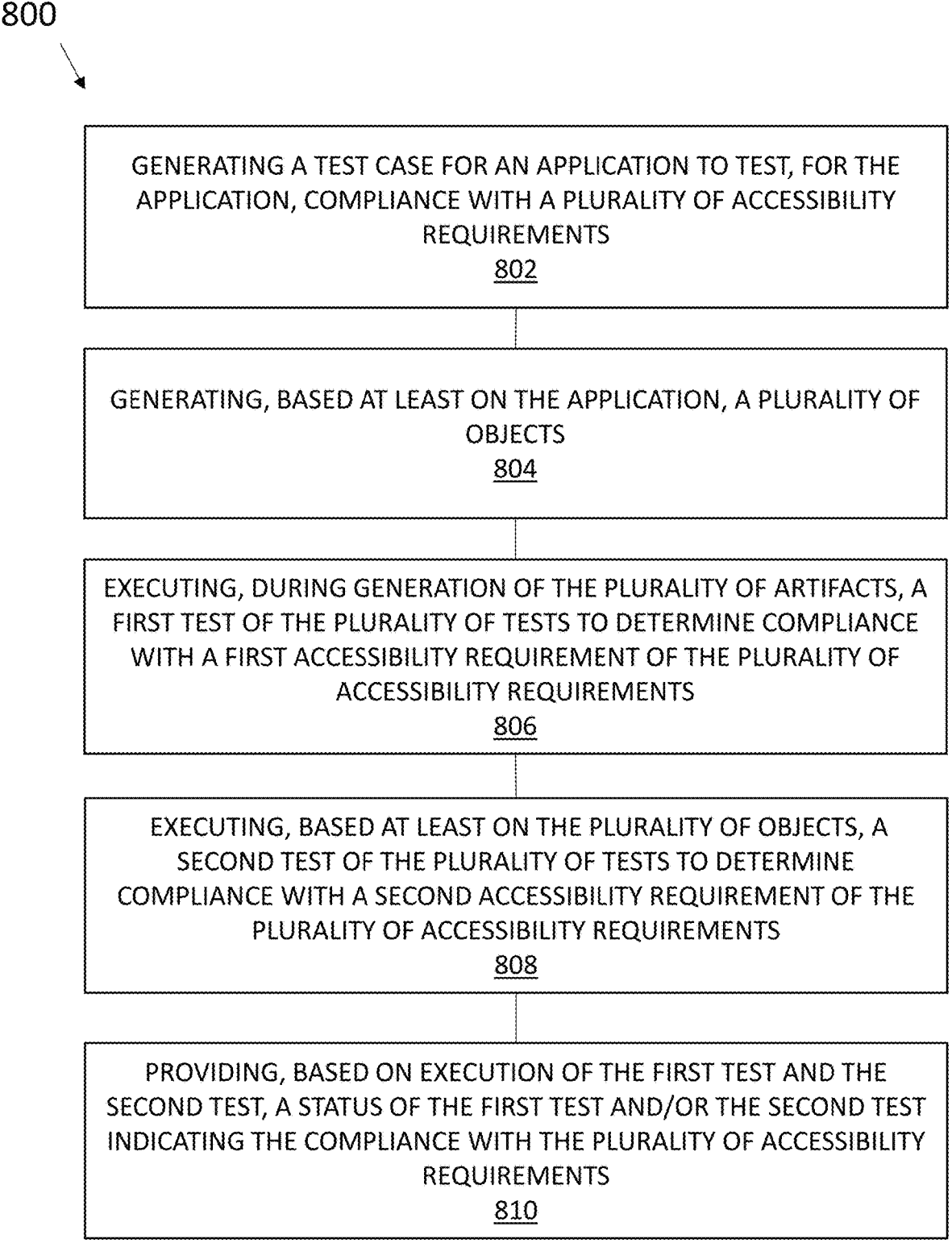
FIG. 8 depicts a flowchart illustrating an example of a process for intelligent accessibility testing, in accordance with some example embodiments.

FIG. 8 depicts a flowchart illustrating a process 800 for accessibility testing of an application-under-test in accordance with some example embodiments. Referring to FIGS. 1-7, one or more aspects of the process 800 may be performed by the accessibility testing system 100, the test controller 110, other components therein, and/or the like.

At 802, the test controller 110 may generate a test case for an application, such as an application-under test (e.g., the application-under-test 250). The test case may test, for the application, compliance with a plurality of accessibility requirements. The test case may include a plurality of tests.

At 804, the test controller 110 may generate, based at least on the application, a plurality of objects. The plurality of objects may be generated in parallel with execution of the first test. In other embodiments, the plurality of objects is generated as part of the execution of the first test (e.g., the contrast ratio test). The plurality of objects may include at least one of a screenshot, a video, and a color contrast value. The plurality of objects may be stored, such as in a database (e.g., the database 130). The plurality of objects may be stored for use in executing a second test, without accessing the application. This allows for quick and efficient execution of additional tests.

At 806, the test controller 110 may execute, such as during generation of the plurality of objects, a first test of the plurality of tests to determine compliance with a first accessibility requirement of the plurality of accessibility requirements. In some embodiments, the test controller 110 receives a nomination of the first test and triggers, based on receipt of the first test, execution of the first test. The first test may include a contrast ratio test that tests a contrast ratio of a user interface of the application. In this example, the first accessibility requirement may include a contrast ratio threshold for comparison with the contrast ratio of various features of the user interface.

At 808, the test controller 110 executes, based at least on the plurality of objects, a second test of the plurality of tests to test compliance with a second accessibility requirement of the plurality of accessibility requirements. In some embodiments, duplicate objects of the plurality of objects can be removed based at least on a comparison between the plurality of objects. For example, the test controller 110 may compare the plurality of generated objects stored in the database 130. The test controller 110 may remove at least one (e.g., one, two, three, four, five, or more) object of the plurality of objects based on a determination that the at least one object is within a similarity threshold of another one of the plurality of objects. The test controller 110 may compare one or more colors, color contrast ratios, pixel-wise representations, and/or the like to determine whether any of the plurality of objects are within the similarity threshold. The test may, using a trained machine learning model, trained to predict a similarity score, determine whether any of the plurality of objects should be removed. Removal of the at least one object improves testing efficiency and reduces computing resources.

In some embodiments, during execution of the second test, the test controller 110 may receive, via a user interface of a first client device of the plurality of client devices, an indication of a bug in a first object of the plurality of objects. The indication may be received based on a selection of a user-selectable element on the user interface. The test controller 110 may store the bug and data associated with the bug collected during the generation of the plurality of objects.

At 810, the test controller 110 may provide, based on execution of the first test and/or the second test, a status of the first test and/or the second test, indicating the compliance with the plurality of accessibility requirements. For example, the status may indicate whether the application has passed and/or failed compliance with the plurality of accessibility requirements. The status may indicate a progress of execution of the plurality of tests. The status and the plurality of objects may accessible to a plurality of client devices communicatively coupled with the test controller 110.

In some embodiments, the test controller 110 generate a release recommendation based on the status and the compliance with the plurality of accessibility requirements. For example, the test controller 110 may generate one or more recommendations for bringing the application into compliance with the plurality of accessibility requirements.

In some embodiments, the test controller 110 executes a third test, such as a VoALT test, of the plurality of accessibility requirements. In such embodiments, the test controller 110 may access the application for to execute the third test, such as via a browser of the corresponding client device. The third test may be executed in parallel with the execution of the second test.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory result in operations comprising: generating a test case for an application, wherein the test case includes a plurality of tests, and wherein the test case is configured to test, for the application, compliance with a plurality of accessibility requirements; generating, based at least on the application, a plurality of objects; executing, during generation of the plurality of objects, a first test of the plurality of tests to determine compliance with a first accessibility requirement of the plurality of accessibility requirements; executing, based at least on the plurality of objects, a second test of the plurality of tests to determine compliance with a second accessibility requirement of the plurality of accessibility requirements; and providing, based on execution of the first test and the second test, a status of the first test and/or the second test indicating the compliance with the plurality of accessibility requirements.

Example 2: The system of example 1, wherein the plurality of objects comprises at least one of a screenshot, a video, and a color contrast value.

Example 3: The system of any one of examples 1 to 2, wherein the plurality of objects are stored for use in executing the second test without accessing the application.

Example 4: The system of any one of examples 1 to 3, wherein the operations further comprise receiving a nomination of the first test; and triggering, based on the receiving, the executing the first test.

Example 5: The system of any one of examples 1 to 4, wherein the first test includes a contrast ratio, wherein the first accessibility requirement includes a contrast ratio threshold.

Example 6: The system of any one of examples 1 to 5, wherein the operations further comprise: removing duplicate objects of the plurality of objects based at least on a comparison between the plurality of objects.

Example 7: The system of any one of examples 1 to 6, wherein the status and the plurality of objects are accessible to a plurality of client devices.

Example 8: The system of example 7, wherein the operations further comprise: receiving, via a user interface of a first client device of the plurality of client devices, an indication of a bug in a first object of the plurality of objects; and storing the bug and data associated with the bug collected during the generation of the plurality of objects.

Example 9: The system of any one of examples 1 to 8, wherein the operations further comprise: executing a third test of the plurality of tests to test compliance with a third accessibility requirement of the plurality of accessibility requirements; wherein the executing comprises accessing the application to execute the third test; and wherein the third test is executed in parallel with the execution of the second test.

Example 10: The system of any one of examples 1 to 9, wherein the operations further comprise: generating a recommendation based on the status and the compliance with the plurality of accessibility requirements.

Example 11: A computer-implemented method, comprising: generating a test case for an application, wherein the test case includes a plurality of tests, and wherein the test case is configured to test, for the application, compliance with a plurality of accessibility requirements; generating, based at least on the application, a plurality of objects; executing, during generation of the plurality of objects, a first test of the plurality of tests to determine compliance with a first accessibility requirement of the plurality of accessibility requirements; executing, based at least on the plurality of objects, a second test of the plurality of tests to determine compliance with a second accessibility requirement of the plurality of accessibility requirements; and providing, based on execution of the first test and the second test, a status of the first test and/or the second test indicating the compliance with the plurality of accessibility requirements.

Example 12: The method of example 11, wherein the plurality of objects comprises at least one of a screenshot, a video, and a color contrast value.

Example 13: The method of any one of examples 11 to 12, wherein the plurality of objects are stored for use in executing the second test without accessing the application.

Example 14: The method of any one of examples 11 to 13, further comprising receiving a nomination of the first test; and triggering, based on the receiving, the executing the first test.

Example 15: The method of any one of examples 11 to 14, wherein the first test includes a contrast ratio, wherein the first accessibility requirement includes a contrast ratio threshold.

Example 16: The method of any one of examples 11 to 15, further comprising removing duplicate objects of the plurality of objects based at least on a comparison between the plurality of objects.

Example 17: The method of any one of examples 11 to 16, wherein the status and the plurality of objects are accessible to a plurality of client devices.

Example 18: The method of any one of examples 11 to 17, receiving, via a user interface of a first client device of the plurality of client devices, an indication of a bug in a first object of the plurality of objects; and storing the bug and data associated with the bug collected during the generation of the plurality of objects.

Example 19: The method of any one of examples 11 to 18, further comprising: executing a third test of the plurality of tests to test compliance with a third accessibility requirement of the plurality of accessibility requirements; wherein the executing comprises accessing the application to execute the third test; and wherein the third test is executed in parallel with the execution of the second test.

Example 20: A non-transitory computer-readable medium storing instructions, which when executed by at least one data processor, result in operations comprising: generating a test case for an application, wherein the test case includes a plurality of tests, and wherein the test case is configured to test, for the application, compliance with a plurality of accessibility requirements; generating, based at least on the application, a plurality of objects; executing, during generation of the plurality of objects, a first test of the plurality of tests to determine compliance with a first accessibility requirement of the plurality of accessibility requirements; executing, based at least on the plurality of objects, a second test of the plurality of tests to determine compliance with a second accessibility requirement of the plurality of accessibility requirements; and providing, based on execution of the first test and the second test, a status of the first test and/or the second test indicating the compliance with the plurality of accessibility requirements.

Figure 9:
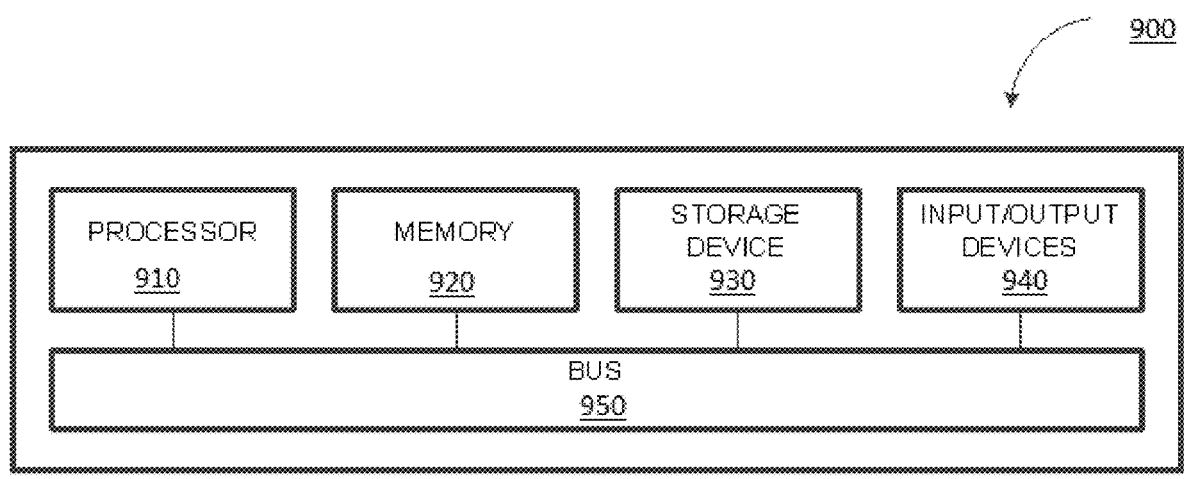
FIG. 9 depicts a block diagram illustrating an example of a computing system, in accordance with some example embodiments.

FIG. 9 depicts a block diagram illustrating a computing system 900, in accordance with some example embodiments. Referring to FIGS. 1-8, the computing system 900 can be used to implement the test controller 110, the accessibility testing system 100, and/or any components therein.

As shown in FIG. 9, the computing system 900 can include a processor 910, a memory 920, a storage device 930, and an input/output device 940. The processor 910, the memory 920, the storage device 930, and the input/output device 940 can be interconnected via a system bus 950. The processor 910 is capable of processing instructions for execution within the computing system 900. Such executed instructions can implement one or more components of, for example, the test controller 110, the accessibility testing system 100. In some implementations of the current subject matter, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a floppy disk device, a hard disk device, an optical disk device, or a tape device, or other suitable persistent storage means. The input/output device 940 provides input/output operations for the computing system 900. In some implementations of the current subject matter, the input/output device 940 includes a keyboard and/or pointing device. In various implementations, the input/output device 940 includes a display unit for displaying graphical user interfaces.

According to some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some implementations of the current subject matter, the computing system 900 can be used to execute various interactive computer software applications that can be used for organization, analysis and/or storage of data in various (e.g., tabular) format (e.g., Microsoft Excel®, and/or any other type of software). Alternatively, the computing system 900 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 940. The user interface can be generated and presented to a user by the computing system 900 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory result in operations comprising:
      generating a test case for an application, wherein the test case includes a plurality of tests, and wherein the test case is configured to test, for the application, compliance with a plurality of accessibility requirements;
      generating, based at least on the application, a plurality of objects;
      executing, during generation of the plurality of objects, a first test of the plurality of tests to determine compliance with a first accessibility requirement of the plurality of accessibility requirements;
      executing, based at least on the plurality of objects, a second test of the plurality of tests to determine compliance with a second accessibility requirement of the plurality of accessibility requirements; and
      providing, based on execution of the first test and the second test, a status of the first test and/or the second test indicating the compliance with the plurality of accessibility requirements.

2. The system of claim 1, wherein the plurality of objects comprises at least one of a screenshot, a video, and a color contrast value.

3. The system of claim 1, wherein the plurality of objects are stored for use in executing the second test without accessing the application.

4. The system of claim 1, wherein the operations further comprise receiving a nomination of the first test; and triggering, based on the receiving, the executing the first test.

5. The system of claim 1, wherein the first test includes a contrast ratio, wherein the first accessibility requirement includes a contrast ratio threshold.

6. The system of claim 1, wherein the operations further comprise: removing duplicate objects of the plurality of objects based at least on a comparison between the plurality of objects.

7. The system of claim 1, wherein the status and the plurality of objects are accessible to a plurality of client devices.

8. The system of claim 7, wherein the operations further comprise:
   receiving, via a user interface of a first client device of the plurality of client devices, an indication of a bug in a first object of the plurality of objects; and
   storing the bug and data associated with the bug collected during the generation of the plurality of objects.

9. The system of claim 1, wherein the operations further comprise: executing a third test of the plurality of tests to test compliance with a third accessibility requirement of the plurality of accessibility requirements; wherein the executing comprises accessing the application to execute the third test; and wherein the third test is executed in parallel with the execution of the second test.

10. The system of claim 1, wherein the operations further comprise: generating a recommendation based on the status and the compliance with the plurality of accessibility requirements.

11. A computer-implemented method, comprising:
generating a test case for an application, wherein the test case includes a plurality of tests, and wherein the test case is configured to test, for the application, compliance with a plurality of accessibility requirements;
generating, based at least on the application, a plurality of objects;
executing, during generation of the plurality of objects, a first test of the plurality of tests to determine compliance with a first accessibility requirement of the plurality of accessibility requirements;
executing, based at least on the plurality of objects, a second test of the plurality of tests to determine compliance with a second accessibility requirement of the plurality of accessibility requirements; and
providing, based on execution of the first test and the second test, a status of the first test and/or the second test indicating the compliance with the plurality of accessibility requirements.

12. The method of claim 11, wherein the plurality of objects comprises at least one of a screenshot, a video, and a color contrast value.

13. The method of claim 11, wherein the plurality of objects are stored for use in executing the second test without accessing the application.

14. The method of claim 11, further comprising receiving a nomination of the first test; and triggering, based on the receiving, the executing the first test.

15. The method of claim 11, wherein the first test includes a contrast ratio, wherein the first accessibility requirement includes a contrast ratio threshold.

16. The method of claim 11, further comprising removing duplicate objects of the plurality of objects based at least on a comparison between the plurality of objects.

17. The method of claim 11, wherein the status and the plurality of objects are accessible to a plurality of client devices.

18. The method of claim 11, further comprising:
receiving, via a user interface of a first client device of the plurality of client devices, an indication of a bug in a first object of the plurality of objects; and
storing the bug and data associated with the bug collected during the generation of the plurality of objects.

19. The method of claim 11, further comprising: executing a third test of the plurality of tests to test compliance with a third accessibility requirement of the plurality of accessibility requirements; wherein the executing comprises accessing the application to execute the third test; and wherein the third test is executed in parallel with the execution of the second test.

20. A non-transitory computer-readable medium storing instructions, which when executed by at least one data processor, result in operations comprising:
generating a test case for an application, wherein the test case includes a plurality of tests, and wherein the test case is configured to test, for the application, compliance with a plurality of accessibility requirements;
generating, based at least on the application, a plurality of objects;
executing, during generation of the plurality of objects, a first test of the plurality of tests to determine compliance with a first accessibility requirement of the plurality of accessibility requirements;
executing, based at least on the plurality of objects, a second test of the plurality of tests to determine compliance with a second accessibility requirement of the plurality of accessibility requirements; and
providing, based on execution of the first test and the second test, a status of the first test and/or the second test indicating the compliance with the plurality of accessibility requirements.

* * * * *